(12) United States Patent
Inamitsu

(10) Patent No.: US 12,233,717 B2
(45) Date of Patent: Feb. 25, 2025

(54) CONTROL DEVICE

(71) Applicant: UNIVANCE CORPORATION, Kosai (JP)

(72) Inventor: Yukihiro Inamitsu, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 297 days.

(21) Appl. No.: 17/795,510

(22) PCT Filed: Jan. 30, 2020

(86) PCT No.: PCT/JP2020/003425
§ 371 (c)(1),
(2) Date: Jul. 26, 2022

(87) PCT Pub. No.: WO2021/152772
PCT Pub. Date: Aug. 5, 2021

(65) Prior Publication Data
US 2023/0331095 A1 Oct. 19, 2023

(51) Int. Cl.
*B60L 15/20* (2006.01)
*B60K 6/20* (2007.10)
(Continued)

(52) U.S. Cl.
CPC .............. *B60L 15/20* (2013.01); *B60L 7/18* (2013.01); *F16H 57/12* (2013.01); *B60K 6/20* (2013.01);
(Continued)

(58) Field of Classification Search
CPC .......... F16H 57/12; F16H 48/11; F16D 13/52; F16D 21/06; B60K 6/54; B60K 6/365; A63H 11/00
See application file for complete search history.

(56) References Cited

U.S. PATENT DOCUMENTS

| | | | |
|---|---|---|---|
| 2009/0093331 A1* | 4/2009 | Iwanaka | B60K 6/365 903/910 |
| 2011/0175475 A1* | 7/2011 | Makino | F16D 21/06 310/78 |

(Continued)

FOREIGN PATENT DOCUMENTS

| | | | |
|---|---|---|---|
| DE | 3635095 C2 * | 2/1990 | B60K 28/16 |
| JP | 2003-33084 A | 1/2003 | |

(Continued)

OTHER PUBLICATIONS

International Search Report dated Apr. 14, 2020, issued in counterpart International application No. PCT/JP2020/003425, with English translation. (5 pages).

(Continued)

*Primary Examiner* — Yuri Kan
(74) *Attorney, Agent, or Firm* — WHDA, LLP (57) ABSTRACT

A control device for a vehicle is provided with: two drive devices; a first speed reducer that transmits the torque of one drive device to an output shaft; and a second speed reducer that transmits the torque of the other drive device to the output shaft. The control device is provided with a torque control unit that controls, according to a target torque, the torque output by the two drive devices. The torque control unit includes a restriction unit that controls the torque output by the two drive devices when the sign of the target torque is changed from a first sign to a second sign. While outputting torque that reduces the backlash of the first speed reducer or the second speed reducer to one of the drive devices, the restriction unit outputs torque according to the target torque to the other drive device.

4 Claims, 5 Drawing Sheets

(51) Int. Cl.
    *B60L 7/18*     (2006.01)
    *F16H 57/00*     (2012.01)
    *F16H 57/12*     (2006.01)

(52) U.S. Cl.
    CPC ..... *B60L 2220/42* (2013.01); *B60L 2240/423* (2013.01); *B60L 2270/142* (2013.01); *B60Y 2200/92* (2013.01); *F16H 57/0006* (2013.01); *F16H 2057/123* (2013.01)

(56) References Cited

U.S. PATENT DOCUMENTS

| | | | |
|---|---|---|---|
| 2015/0192192 A1* | 7/2015 | Honda | F16H 48/11 475/10 |
| 2016/0185336 A1 | 6/2016 | Ueno et al. | |
| 2017/0203754 A1 | 7/2017 | Kawai et al. | |
| 2017/0327102 A1 | 11/2017 | Yamazaki et al. | |
| 2018/0072306 A1* | 3/2018 | Yamazaki | B60K 6/54 |
| 2022/0268358 A1* | 8/2022 | Kishida | F16D 13/52 |

FOREIGN PATENT DOCUMENTS

| | | | | |
|---|---|---|---|---|
| JP | 2003033084 A | * | 1/2003 | ............. A63H 11/00 |
| JP | 6065918 B2 | | 1/2017 | |
| JP | 2017-124747 A | | 7/2017 | |
| JP | 2018-57169 A | | 4/2018 | |

OTHER PUBLICATIONS

Written Opinion dated Apr. 14, 2020, issued in counterpart International application No. PCT/JP2020/003425, with English translation. (6 pages).

Extended (Supplementary) European Search Report dated Sep. 14, 2023, issued in counterpart EP Application No. 20916858.2. (6 pages).

* cited by examiner

Fig. 1

| MODE | FIRST ELECTRIC MOTOR | SECOND ELECTRIC MOTOR | FIRST CLUTCH |
|---|---|---|---|
| 1 | ✕ | | |
| 2 A | | ✕ | |
| 2 B | | ✕ | ✕ |
| 3 | ✕ | ✕ | |
| 4 | ✕ | ✕ | ✕ |

CONTROL DEVICE

TECHNICAL FIELD

The present invention relates to a control device for a vehicle in which two drive devices are mounted.

BACKGROUND ART

When a target torque changes from negative torque to positive torque in a control device for a vehicle in which two drive devices are mounted, the technology disclosed in Patent Literature 1 ensures that the torque to be outputted from the drive devices is limited to a torque for reducing the backlash (a gap provided in the direction of machine element movement) of a driving force transmission system for a predetermined period of time. Since the torque to be outputted from the drive devices is limited at the time of backlash reduction, it is possible to suppress the generation of abnormal noise and impact, which may occur due, for instance, to gear rattling.

CITATION LIST

Patent Literature

Patent Literature 1: Japanese Patent No. 6065918

SUMMARY OF INVENTION

Technical Problem

However, according to the above technology, the torque outputted from the drive devices remains unincreased during backlash reduction. Therefore, acceleration intended by a driver will not be achieved during backlash reduction. This causes a problem where the driver feels uncomfortable.

The present invention has been made to solve the above problem. An object of the present invention is to provide a control device that is able to reduce the possibility of giving an uncomfortable feeling to the driver during backlash reduction by suppressing the generation of abnormal noise and impact when the backlash is reduced.

Solution to Problem

In order to accomplish the above object, according to an aspect of the present invention, there is provided a control device for a vehicle including two drive devices, a first speed reducer, and a second speed reducer. The first speed reducer transmits the torque of one of the two drive devices to an output shaft. The second speed reducer transmits the torque of the other drive device to the output shaft at a reduction ratio different from the reduction ratio of the first speed reducer. The control device includes a torque control section that, based on a target torque, controls the torques outputted from the two drive devices. The torque control section includes a limiting section for controlling the torques that are outputted from the two drive devices when the sign of the target torque changes from a first sign to a second sign. While allowing one of the two drive devices to output the torque for reducing the backlash of the first or second speed reducer, the limiting section allows the other drive device to output a torque based on the target torque.

Advantageous Effects of Invention

When the sign of the target torque changes from the first sign to the second sign, the control device according to a first aspect of the present invention allows the limiting section to control the torques to be outputted from the two drive devices. While one of the two drive devices is allowed by the limiting section to output the torque for reducing the backlash of the first or second speed reducer, the other drive device outputs a torque based on the target torque. This suppresses the generation of abnormal noise and impact when the backlash is reduced. Further, the torque based on the target torque is outputted from the drive device even during backlash reduction. This reduces the possibility of giving an uncomfortable feeling to the driver during backlash reduction.

It should be noted that "when the sign of the target torque changes from the first sign to the second sign" does not indicate the moment when the sign changes, but indicates not only the moment of the sign change but also a period of time before and after the moment of the sign change.

While the sign of the target torque is the first sign, the control device according to a second aspect of the present invention allows the limiting section to let one of the two drive devices start outputting the torque for reducing the backlash. Backlash reduction starts before a change in the sign of the target torque. Consequently, in addition to the advantageous effects provided by the first aspect, it is possible to provide improved responsiveness for controlling the vehicle as intended by the driver.

As regards the control device according to a third aspect of the present invention, at least one of the two drive devices is an electric motor, and the limiting section allows the electric motor to output a braking torque and allows the other drive device to output a power running torque. As a result, in addition to the advantageous effects provided by the first or second aspect, the braking torque outputted from the electric motor makes it possible to provide accurate control based on the target torque.

DESCRIPTION OF EMBODIMENTS

Figure 1:
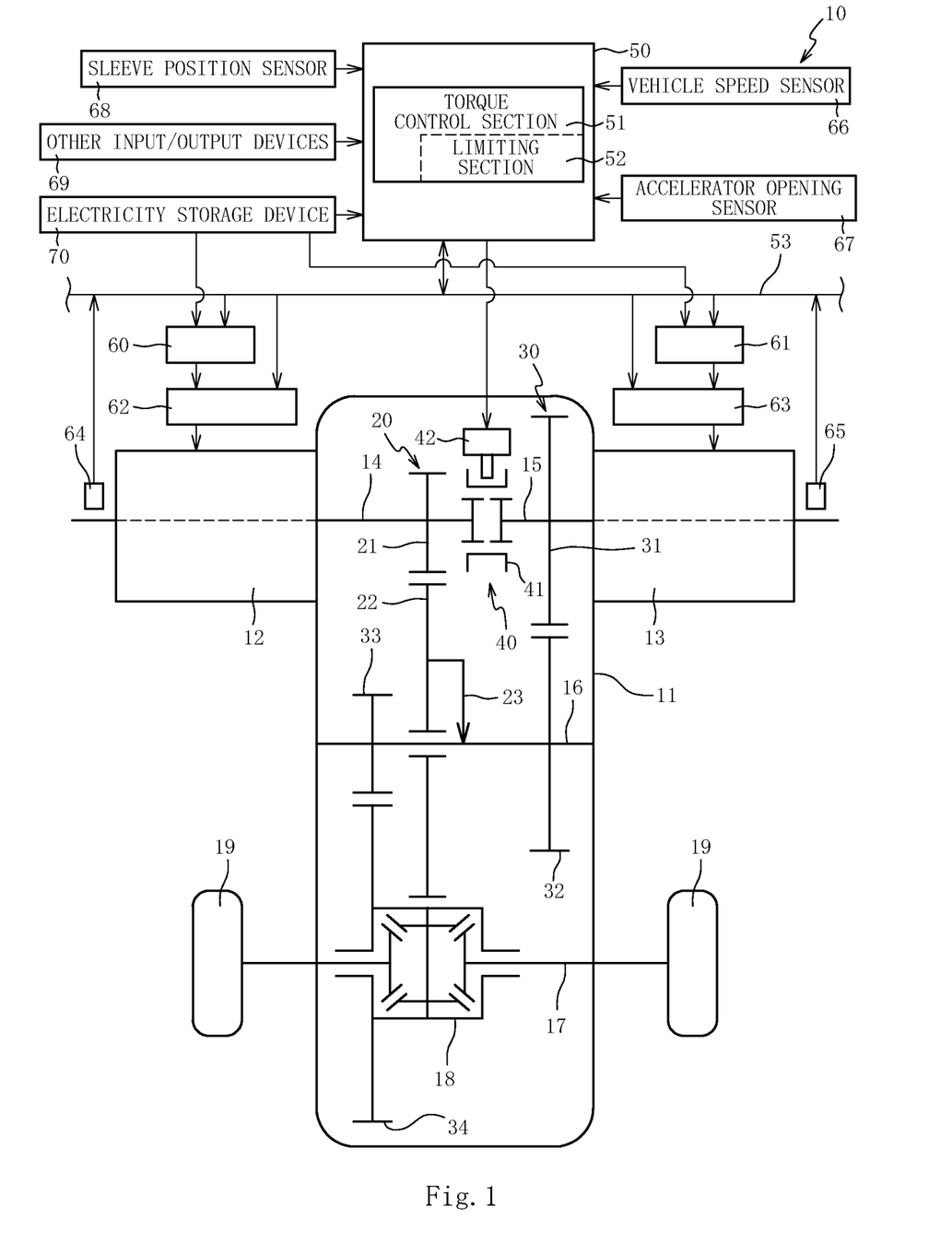
FIG. 1 is a functional block diagram illustrating a vehicle in an embodiment of the present invention.

A preferred embodiment of the present invention will now be described with reference to the accompanying drawings. FIG. 1 is a functional block diagram illustrating a vehicle 10 in the embodiment of the present invention. Mounted in the vehicle 10 are a power transmission device 11, a first drive device 12, a second drive device 13, and a control device 50.

Disposed in the power transmission device 11 are a first input shaft 14, a second input shaft 15, and an output shaft 16. The first input shaft 14 is to be connected to the first drive device 12. The second input device 15 is to be connected to the second drive device 13. In the present embodiment, the first input shaft 14 and the second input shaft 15 are coaxially disposed. The first input shaft 14 (the second input shaft 15) and the output shaft 16 are disposed in parallel with each other. The first input shaft 14 and the second input shaft 15 are main shafts that directly receive the driving force of the first drive device 12 and the driving force of the second drive device 13, respectively.

The first input shaft 14 and the second input shaft 14 are relatively rotatably linked to each other through a pilot bearing (not depicted). In the present embodiment, the first drive device 12 and the second drive device 13 are electric motors having the same torque characteristics.

A mechanical output of the output shaft 16 is transmitted to a differential device 18 that is disposed midway between axles 17. The axles 17 are disposed in parallel with the output shaft 16. The differential device 18 distributes driving force to the left and right axles 17. It is obviously possible to install a limiting device that limits the operation of the differential device 18. Wheels 19 are respectively disposed at the ends of the axles 17. A plurality of wheels (not depicted) are provided for the vehicle 10 in addition to the wheels 19. The vehicle 10 runs when rotationally driven by the axles 17 and the wheels 19.

A first speed reducer 20 is a mechanism that reduces the speed of rotation of the first input shaft 14, and transmits the resulting rotation to the output shaft 16. The first speed reducer 20 includes a first gear 21 and a second gear 22. The first gear 21 is to be coupled to the first input shaft 14. When a second clutch 23 is engaged or disengaged, the second gear 22 becomes coupled to the output shaft 16 or idles around the output shaft 16. The second gear 22 meshes with the first gear 21. The first speed reducer 20 is set to a reduction ratio that is provided when the first gear 21 meshes with the second gear 22.

The second clutch 23 intervenes between the output shaft 16 and the second gear 22. The second clutch 23 is a one-way clutch that transmits forward-rotation power from the second gear 22 to the output shaft 16. The second clutch 23 not only transmits the forward rotation of the second gear 22 to the output shaft 16, but also blocks the transmission of forward rotation from the output shaft 16 to the second gear 22.

A second speed reducer 30 is a mechanism that reduces the speed of rotation of the second input shaft 15, and transmits the resulting rotation to the output shaft 16. The second speed reducer 30 includes a third gear 31 and a fourth gear 32. The third gear 31 is to be coupled to the second input shaft 15. The fourth gear 32 becomes coupled to the output shaft 16 and meshes with the third gear 31. The second drive device 13 is able to constantly transmit power to the output shaft 16 through the second speed reducer 30. When the third gear 31 meshes with the fourth gear 32, the second speed reducer 30 is set to a reduction ratio that is smaller than the reduction ratio of the first speed reducer 20. The first speed reducer 20 is used as a low-speed transmission path, whereas the second speed reducer 30 is used as a high-speed transmission path.

A fifth gear 33 is to be coupled to the output shaft 16. The fifth gear 33 meshes with a sixth gear 34. The sixth gear 34 is to be coupled to the differential device 18. The fifth gear 33 and the sixth gear 34 transmit power of the output shaft 16 to the axles 17 through the differential device 18.

A first clutch 40 disconnects the first input shaft 14 from the second input shaft 15 or connects them together. The first clutch 40 is disposed between the first input shaft 14 and the second input shaft 15. In the present embodiment, the first clutch 40 is a dog clutch. The control device 50 engages or disengages the first clutch 40 by moving a sleeve 41 through the use of an actuator 42. However, the first clutch 40 is not limited to the above-described one. It is obviously possible to adopt a friction clutch or other clutch as the first clutch 40 or incorporate a synchromesh.

The first gear 21, the second gear 22, the third gear 31, the fourth gear 32, the fifth gear 33, and the sixth gear 34 are machine elements that move in collaboration with each other. The second clutch 23 and the differential device 18 each include a plurality of machine elements that move in collaboration with each other. A backlash (gap) is provided between the machine elements in the direction of machine element movement.

The control device 50 (ECU) controls the first drive device 12, the second drive device 13, and the first clutch 40. The control device 50 includes a CPU, a ROM, a RAM, and a backup RAM (none of these component elements are depicted).

The CPU includes a torque control section 51 that controls the first drive device 12 and the second drive device 13. The torque control section 51 includes a limiting section 52. The ROM stores a map and a program. The map and the program are referenced when the program is to be executed. The CPU performs arithmetic processing in accordance with the program and map stored in the ROM. The RAM is a memory that temporarily stores, for example, the result of arithmetic processing performed in the CPU. The backup RAM is a nonvolatile memory that memorizes, for example, data to be stored.

The control device 50 is connected to inverters 60, 61 and switching devices 62, 63 through a CAN communication line 53. The inverter 60 is connected to the first drive device 12 through the switching device 62. The inverter 61 is connected to the second drive device 13 through the switching device 63. The control device 50 uses the inverters 60, 61 to control the first drive device 12 and the second drive device 13.

The switching devices 62, 63 provide electrical braking of the first drive device 12 and second drive device 13. The switching devices 62, 63 switch circuits in accordance with the types of the first drive device 12 and second drive device 13, and provide electrical braking such as regenerative braking for applying a reverse torque to a rotor, reverse-phase braking, or single-phase braking. Based on circuit switching by the switching devices 62, 63, the control device 50 switches between driving and braking of the first drive device 12 and second drive device 13.

The control device 50 is connected through the CAN communication line 53 to a first rotation sensor 64, a second rotation sensor 65, a vehicle speed sensor 66, an accelerator opening sensor 67, a sleeve position sensor 68, and other input/output devices 69.

The first rotation sensor 64 is a device that detects the number of revolutions (rotation speed) of the first drive device 12. The first rotation sensor 64 includes an output circuit (not depicted) that detects the number of revolutions of the first input shaft 14, processes the result of detection, and outputs the processed result to the control device 50. The second rotation sensor 65 is a device that detects the number of revolutions (rotation speed) of the second drive device 13. The second rotation sensor 65 includes an output circuit (not depicted) that detects the number of revolutions of the second input shaft 15, processes the result of detection, and outputs the processed result to the control device 50.

The control device 50 detects the amount of current flowing to the inverter 60 and feeds back the result of detection in order to control the torque of the first drive device 12, and detects the amount of current flowing to the inverter 61 and feeds back the result of detection in order to control the torque of the second drive device 13. Further, the control device 50 allows the first rotation sensor 64 to detect the number of revolutions of the first input shaft 14 and feeds back the result of detection in order to control the number of revolutions of the first drive device 12, and allows the second rotation sensor 65 to detect the number of revolutions of the second input shaft 15 and feeds back the result of detection in order to control the number of revolutions of the second drive device 13.

The vehicle speed sensor 66 is a device that detects the speed of the vehicle 10 (hereinafter referred to as the "vehicle speed"). The vehicle speed sensor 66 includes an output circuit (not depicted) that detects the rotation speed of the output shaft 16, calculates the vehicle speed in consideration, for example, of the reduction ratios of the fifth gear 33, sixth gear 34, and differential device 18 and the size of the wheels 19, and outputs the calculated vehicle speed to the control device 50.

The accelerator opening sensor 67 includes an output circuit (not depicted) that detects the amount of depression of an accelerator pedal (not depicted) depressed by the driver, processes the result of detection, and outputs the processed result to the control device 50. The output of the accelerator opening sensor 67 is proportional to the driving force (torque/radius of wheels 19) requested by the driver.

A total torque requested by the driver, that is, the torque required for the output shaft 16 (hereinafter referred to as the "target torque"), is determined by the result of detection by the accelerator opening sensor 67 (accelerator opening) and the result of detection by the vehicle speed sensor 66 (vehicle speed). In the present embodiment, the target torque is expressed as the torque of the output shaft 16 that is determined in consideration of the reduction ratios of the fifth gear 33, sixth gear 34, and differential device 18 and the radius of the wheels 19.

The sleeve position sensor 68 includes an output circuit (not depicted) that detects the position of the sleeve 41 of the first clutch 40, processes the result of detection, and outputs the processed result to the control device 50. Based on the result of detection by the sleeve position sensor 68, the control device 50 detects whether the first clutch 40 is engaged or disengaged.

The other input/output devices 69 may be, for example, a brake stroke sensor and a notification device. The brake stroke sensor detects the amount of depression of a brake pedal (not depicted) depressed by the driver. The notification device emits, for example, a sound or light to notify the driver that a permissible value is exceeded, for instance, by the temperature of the first drive device 12 or second drive device 13.

For example, a battery or a capacitor is adopted as an electricity storage device 70 that supplies electric power, for instance, to the inverters 60, 61 of the first drive device 12 and second drive device 13 and to the control device 50. The electricity storage device 70 is to be recharged upon receiving the supply of external electric power and the supply of electric power generated by regenerative braking of the first drive device 12 and second drive device 13.

Figure 2:
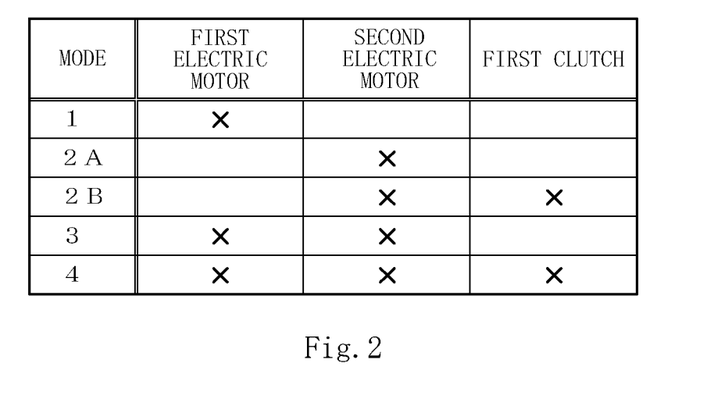
FIG. 2 is a table illustrating the combinations of operations of a first drive device, a second drive device, and a first clutch.

FIG. 2 is a table illustrating the combinations of operations of the first drive device 12, second drive device 13, and first clutch 40. In FIG. 2, the electric motors to be driven and the clutch to be engaged are marked X. Based on the target torque, the torque control section 51 of the control device 50 exercises control in a manner predefined in mode 1, mode 2A, mode 2B, mode 3, or mode 4 in accordance with the map stored in the ROM.

In mode 1, the control device 50 disengages the first clutch 40, de-energizes the second drive device 13, and performs power running control of the first drive device 12. Mode 1 is used when the vehicle starts moving or runs at a low speed. The torque of the first drive device 12 is outputted to the output shaft 16 through the first speed reducer 20, which has a greater reduction ratio than the second speed reducer 30. This makes it possible to obtain a high driving torque at a low speed and achieve a powerful start and low-speed running.

In modes 2 (modes 2A and 2B), the control device 50 performs power running control of the second drive device 13. The torque of the second drive device 13 is outputted to the output shaft 16 through the second speed reducer 30, which has a smaller reduction ratio than the first speed reducer 20. This makes it possible to achieve electricity-efficient high-speed running. The second clutch 23, which is a one-way clutch, blocks the transmission of power from the output shaft 16 to the second gear 22. Therefore, in mode 2A in which the first clutch 40 is disengaged, the second clutch 23 is able to reduce a drag loss that is caused by the first speed reducer 20 and the first drive device 12 when the second drive device 13 drives the output shaft 16.

In mode 2B, the first clutch 40 is engaged so that the first drive device 12 rotates together with the first clutch 40. When switching to mode 4, which engages the first clutch 40 and drives the first drive device 12 and the second drive device 13, is requested in this instance, switching can be smoothly made to mode 4. Further, de-energizing the first drive device 12 in modes 2 makes it possible to reduce the power consumption correspondingly.

It should be noted that the first drive device 12 may be energized in modes 2. The reason is that, when the number of revolutions of the second gear 22 driven by the first drive device 12 is smaller than the number of revolutions of the fourth gear 32 (output shaft 16) driven by the second drive device 13, the second clutch 23 is disengaged to block the driving force of the first drive device 12 from being transmitted to the output shaft 16 because the second clutch 23 is disposed on the output shaft 16.

When the first drive device 12 is energized in modes 2 to increase the number of revolutions of the first drive device 12, the time required for adjusting the number of revolutions of the first input shaft 14 and second input shaft 15 can be reduced. This makes it easy to engage the first clutch 40. Consequently, the time required for switching from modes 2 to mode 4 can be reduced.

In mode 3, the control device 50 references the map while the first clutch 40 is disengaged, and performs power running control of the first drive device 12 and second drive device 13. When the number of revolutions of the second gear 22 driven by the first drive device 12 is larger than the number of revolutions of the fourth gear 32 (output shaft 16) driven by the second drive device 13, the driving force of the first drive device 12 and second drive device 13 is transmitted to the output shaft 16 because the second clutch 23, which is a one-way clutch, is engaged.

Meanwhile, when the number of revolutions of the second gear 22 driven by the first drive device 12 is smaller than the number of revolutions of the fourth gear 32 (output shaft 16) driven by the second drive device 13, the driving force of the second drive device 13 is transmitted to the output shaft 16 because the second clutch 23 is disengaged. As described above, the second clutch 23, which is a one-way clutch, is disposed on the output shaft 16. This makes it possible to seamlessly switch between a state where the first drive device 12 and the second drive device 13 drive the output shaft 16 and a state where the second drive device 13 drives the output shaft 16.

In mode 4, the control device 50 performs power running control of the first drive device 12 and second drive device 13 while the first clutch 40 is engaged. In mode 4, the output shaft 16 is constantly driven by the first drive device 12 and the second drive device 13. Therefore, it is possible to increase the torque to be outputted to the output shaft 16. Particularly, since the second speed reducer 30, which is a high-speed transmission path, is driven by both the first drive device 12 and the second drive device 13, a sufficient driving torque can be obtained to achieve acceleration even during high-speed running.

Figure 3:
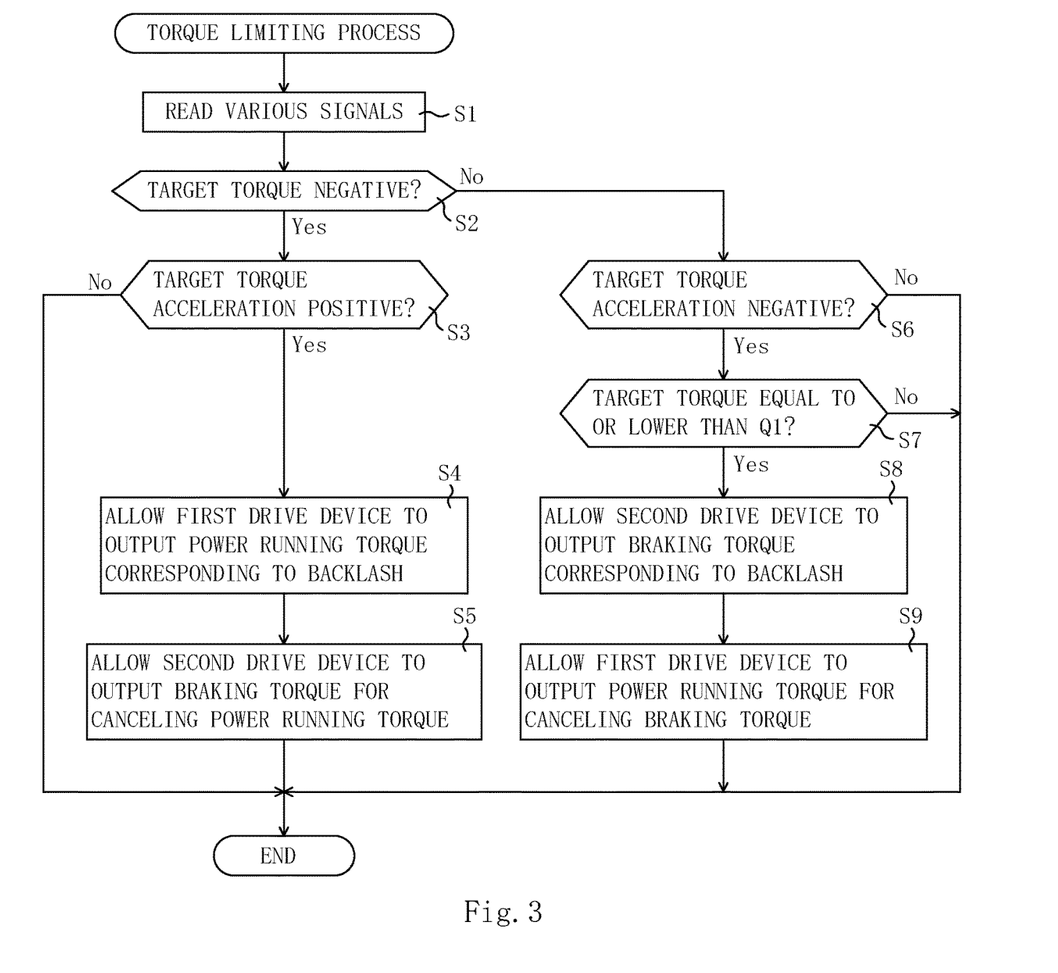
FIG. 3 is a flowchart illustrating a torque limiting process.

A torque limiting process will now be described with reference to FIGS. 3 to 5. FIG. 3 is a flowchart illustrating the torque limiting process. The torque limiting process controls the first drive device 12, the second drive device 13, and the switching devices 62, 63 in order to reduce the backlash provided between the machine elements of the power transmission device 11. The torque limiting process is performed repeatedly (e.g., at 0.2-second intervals) by the limiting section 52 while the control device 50 is turned on.

In the torque limiting process depicted in FIG. 3, the limiting section 52 reads various signals indicative, for example, of the target torque (step S1), and determines whether the direction of the target torque is negative or not (step S2). The direction of the target torque is positive during power running and negative during coasting. If the target torque is negative ("YES" at step S2), processing proceeds to step S3. A case where the target torque changes from negative (first sign) to positive (second sign) will now be described with reference to FIG. 4.

Figure 4:
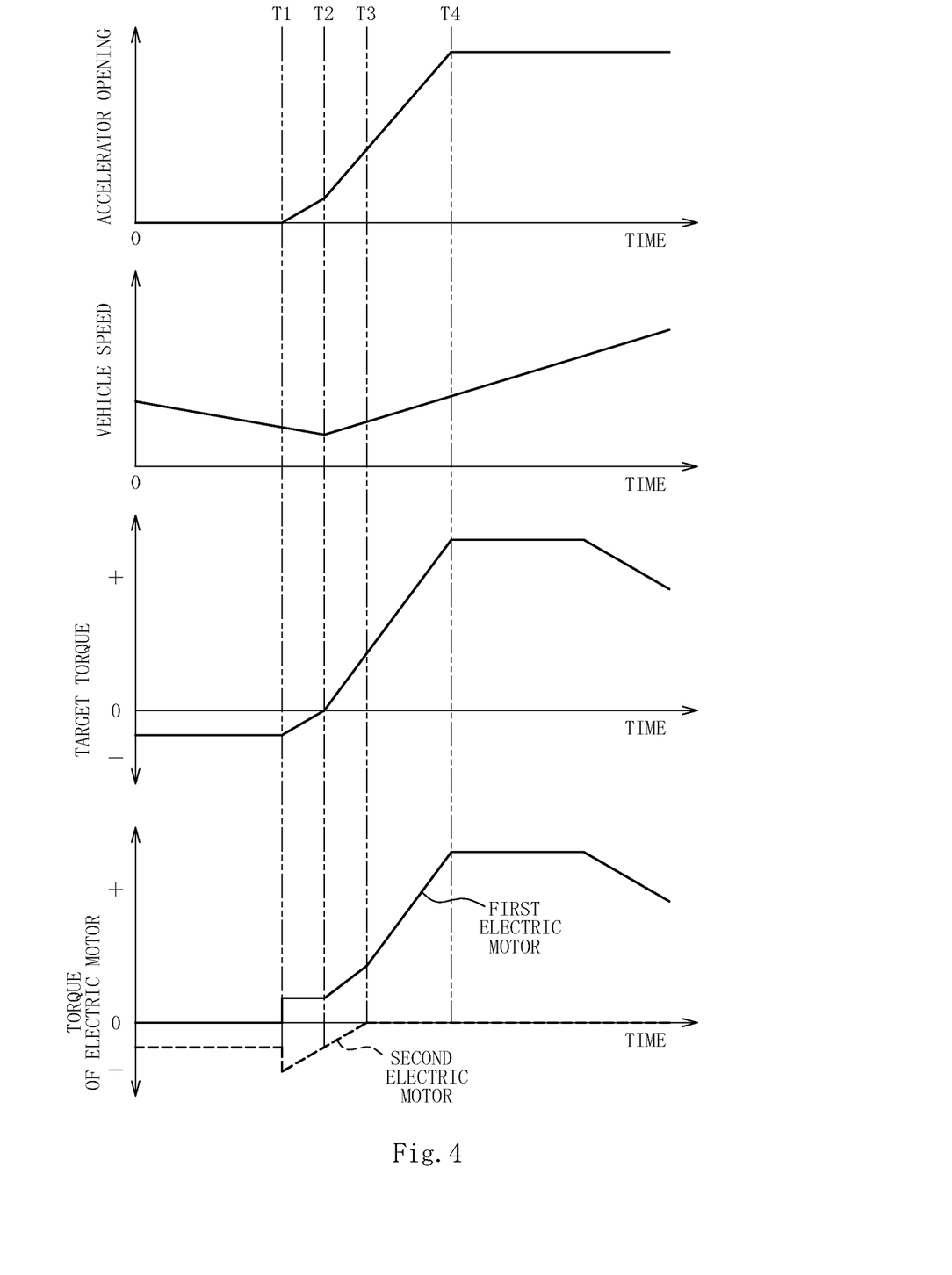
FIG. 4 is a timing diagram of torque.
Figure 5:
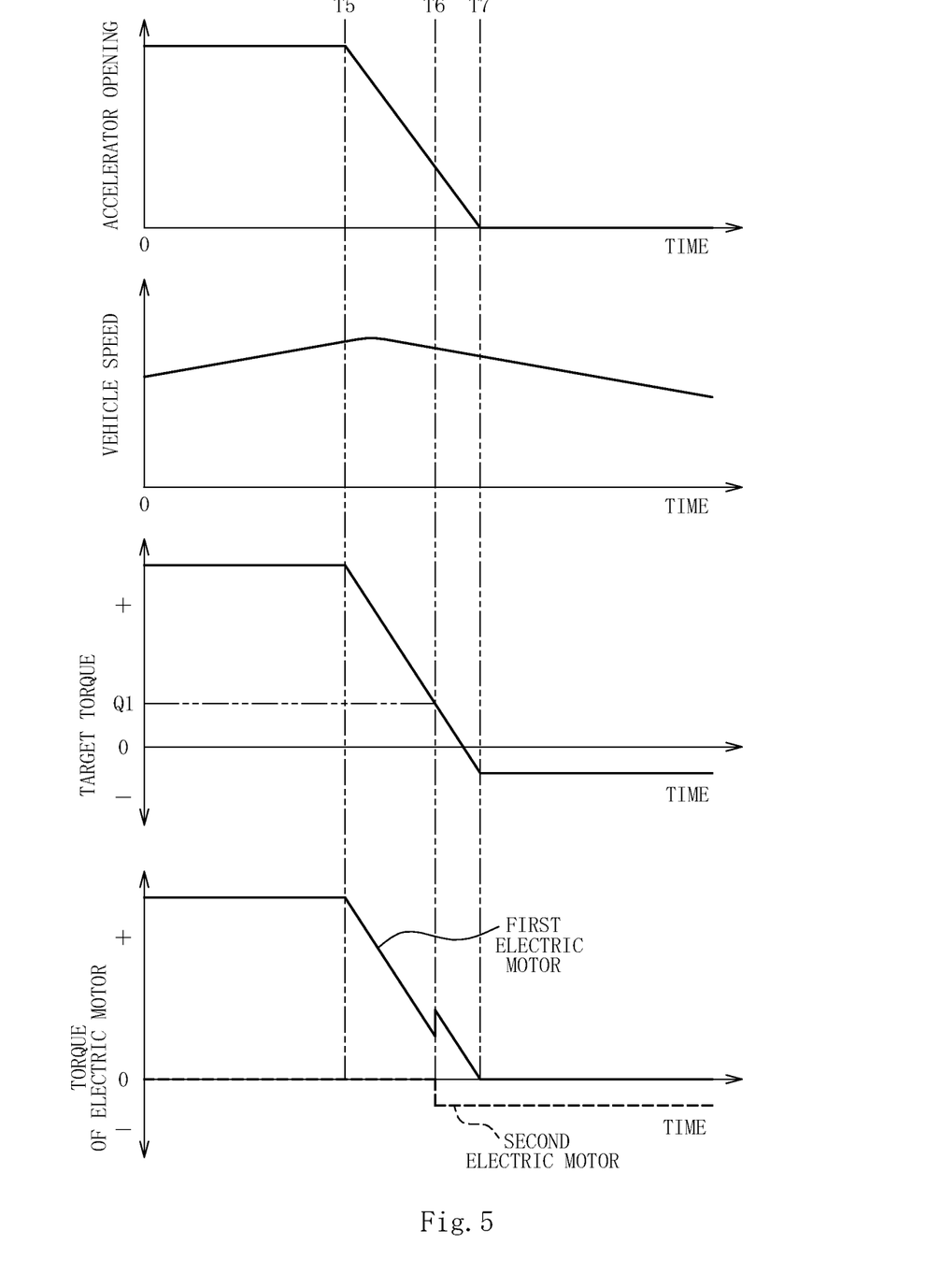
FIG. 5 is a timing diagram of torque.

FIG. 4 is a timing diagram of torque. The horizontal axis of FIG. 4 represents time. The limiting section 52 controls the torque when the sign of the target torque changes from negative to positive (during a period between time T1 and time T3). During a period between time 0 and time T1, the accelerator opening is 0 so that the vehicle 10 is coasting. The vehicle speed gradually decreases due, for instance, to air resistance during the period between time 0 and time T1. While the accelerator opening is 0 so that the vehicle 10 is coasting, the first clutch 40 is disengaged by the torque control section 51. The target torque during the period between time 0 and time T1 is a fixed negative value.

During coasting, the rotation of the axles 17 is transmitted to the output shaft 16, and then transmitted to the second input shaft 15 through the second speed reducer 30. Since a reverse torque is inputted to the second drive device 13, the second drive device 13 is regeneratively braked. Since the rotation of the axles 17 is transmitted to the output shaft 16 during coasting, the backlash between the machine elements, such as the second speed reducer 30 and the second clutch 23, can be directed in a power running direction.

As depicted in FIG. 3, the limiting section 52 determines, in step S3, whether the acceleration of the target torque is positive or not. The acceleration of the target torque is 0 during the period between time 0 and time T1. At time T1, when the driver begins to depress the accelerator pedal, the acceleration of the target torque becomes positive. If the acceleration of the target torque is not positive ("NO" at step S3), the limiting section 52 terminates the torque limiting process.

Meanwhile, during a period between time T1 and time T2, during which the accelerator pedal is depressed by the driver, the acceleration of the target torque is positive ("YES" at step S3). In this case, the limiting section 52 allows the first drive device 12 to output a power running torque corresponding to the backlash (step S4). This makes it possible to reduce, during coasting, the backlash that is created in the power running direction, for example, of the first speed reducer 20 and the second clutch 23. Since the backlash can be reduced while the target torque is low, the generation of abnormal noise and impact can be suppressed when the backlash is reduced.

Next, the limiting section 52 switches between the circuits of the switching device 63 to provide reverse-phase or single-phase braking of the second drive device 13, and allows the second drive device 13 to output a braking torque (step S5). The braking torque has a magnitude based on the difference in reduction ratio between the first speed reducer 20 and the second speed reducer 30. The braking torque cancels the power running torque of the first drive device 12 that corresponds to the backlash, and thus outputs the target torque. This enables the first drive device 12 and the second drive device 13 to output a torque corresponding to the target torque even during backlash reduction. Consequently, an acceleration feel intended by the driver is provided. This reduces the possibility of giving an uncomfortable feeling to the driver during backlash reduction.

Particularly, the backlash between the elements of the first speed reducer 20, including the second clutch 23, can be reduced by the power running torque of the first drive device 12. Therefore, the effect of suppressing the generation of abnormal noise and impact at the time of backlash reduction is more enhanced than in the case of reducing the backlash between the elements of the second speed reducer 30.

The limiting section 52 allows the first drive device 12 to start outputting a power running torque that reduces the backlash when the sign of the target torque is negative. Accordingly, backlash reduction starts before the sign of the target torque changes from negative to positive. Therefore, after time T2, when the target torque becomes positive, it is possible to provide improved responsiveness for generating a torque output as intended by the driver.

The second drive device 13 is an electric motor. The limiting section 52 allows the electric motor to output the braking torque, and allows the first drive device 12 to output the power running torque. The torque of the electric motor quickly responds to a current flowing to the electric motor. Therefore, accurate control can be provided based on the target torque because of the braking torque outputted from the second drive device 13, which is an electric motor.

Next, a case where the target torque changes from positive (first sign) to negative (second sign) will be described with reference to FIG. 5. FIG. 5 is a timing diagram of torque. The horizontal axis of FIG. 5 represents time. The limiting section 52 controls the torque when the sign of the target torque changes from positive to negative (during a period between time T6 and time T7). During a period between time 0 and time T5, the accelerator opening is a fixed positive value so that the vehicle 10 is power running. The vehicle speed gradually increases during the period between time 0 and time T5. The target torque during the period between time 0 and time T5 is a fixed positive value.

During power running, the rotations of the first input shaft 14 and second input shaft 15 are transmitted to the output shaft 16. Therefore, the backlash between the machine elements, such as the first speed reducer 20, the second speed reducer 30, and the second clutch 23, can be directed in a coasting direction.

If the target torque is not negative as depicted in FIG. 3 ("NO" at step S2), the limiting section 52 determines whether the acceleration of the target torque is negative or not (step S6). The acceleration of the target torque is 0 during the period between time 0 and time T5, and then becomes negative at time T5. If the acceleration of the target torque is not negative ("NO" at step S6), the limiting section 52 terminates the torque limiting process.

Meanwhile, during a period between time T5 and time T7, when the accelerator pedal is weakly depressed by the driver so that the acceleration of the target torque becomes negative ("YES" at step S6), the limiting section 52 determines whether the target torque is equal to or lower than Q1 (step S7). When the acceleration of the target torque is negative and the target torque is equal to or lower than Q1, it signifies that the driver intends to brake. In this instance, the first clutch 40 is disengaged by the torque control section 51.

When the target torque is equal to or lower than Q1 ("YES" at step S7), the limiting section 52 switches between the circuits of the switching device 63 to provide reverse-phase or single-phase braking of the second drive device 13, and allows the second drive device 13 to output a braking torque corresponding to the backlash (step S8). Consequently, at the time of power running, it is possible to reduce the backlash that is created in the coasting direction of the machine elements of the second speed reducer 30. Since the backlash can be reduced while the target torque is low, it is possible to suppress the generation of abnormal noise and impact at the time of backlash reduction.

Next, the limiting section 52 drives the first drive device 12, and allows the first drive device 12 to output a power running torque for canceling the braking torque of the second drive device 13 in order to satisfy the target torque (step S9). The power running torque of the first drive device 12 is transmitted to the output shaft 16 through the first speed reducer 20. This enables the first drive device 12 and the second drive device 13 to output a torque corresponding to the target torque even during backlash reduction. Consequently, a deceleration feel intended by the driver is provided. This reduces the possibility of giving an uncomfortable feeling to the driver during backlash reduction.

The limiting section 52 allows the second drive device 13 to start outputting a braking torque that reduces the backlash when the sign of the target torque is positive. Accordingly, backlash reduction starts before the sign of the target torque changes from positive to negative. Therefore, after time T6, when the target torque becomes negative, it is possible to provide improved responsiveness for controlling the vehicle 10 as intended by the driver.

While the present invention has been described in conjunction with the preferred embodiment, the present invention is not limited to the above-described preferred embodiment. It will be easily understood that various improvements and modifications may be made without departing from the spirit and scope of the present invention.

The preferred embodiment has been described with reference to a case where control is exercised based on the information inputted, for example, from the vehicle speed sensor 66 and the accelerator opening sensor 67 to switch to mode 1, mode 2A, mode 2B, mode 3, or mode 4 in accordance with the map. However, the present invention is not limited to such mode switching. It is obvious that mode switching may be made by using, for example, the number of revolutions and angular velocities of the output shaft 16 and axles 17 instead of the vehicle speed. The reason is that the use of the number of revolutions and angular velocities of the output shaft 16 and axles 17 is essentially the same as the use of the vehicle speed because the number of revolutions and angular velocities of the output shaft 16 and axles 17 are proportional to the vehicle speed. Further, it is also obvious that an accelerator opening speed (accelerator opening change rate) and other factors may be used as long as they are proportional to the torque requested by the driver. The result of detection by the brake stroke sensor may obviously be regarded as one of such factors.

The preferred embodiment has been described with reference to a case where electric motors having the same torque characteristics are used as the first drive device 12 and the second drive device 13. However, the present invention is not limited to the use of such electric motors. It is obvious that electric motors having different torque characteristics may be used. For example, an electric motor having low-speed torque characteristics may be used as the first drive device 12 while an electric motor having high-speed torque characteristics is used as the second drive device 13.

The preferred embodiment has been described with reference to the vehicle 10 in which the first drive device 12 and the second drive device 13 (two electric motors) are mounted. However, the present invention is not limited to such a configuration. It is obvious that a different electric motor and an engine may be mounted in the vehicle 10 in addition to the first drive device 12 and the second drive device 13.

The preferred embodiment has been described with reference to a case where the first drive device 12 and the second drive device 13 are both electric motors. However, the present invention is not limited to such a configuration. It is obvious that an engine may be used as the first drive device 12 instead of an electric motor. Even when the engine is used as the first drive device 12, the first drive device 12 is able to output a power running torque. Meanwhile, the second drive device 13, which is an electric motor, is able to accurately output a braking torque. This enables the limiting section 52 to accurately control the torque outputted from the first drive device 12 and the second drive device 13.

The preferred embodiment has been described with reference to a case where, in step S4, the first drive device 12 outputs a low power running torque corresponding to the backlash. However, the present invention is not limited to such a power running torque. It is obvious that the power running torque of the first drive device 12 may be determined by the current number of revolutions of the first drive device 12 so as to optimize the efficiency of the first drive device (electric motor). This makes it possible to increase the electricity efficiency of the first drive device 12.

The preferred embodiment has been described with reference to a case where, in step S9, the second drive device 13 outputs a low braking torque corresponding to the backlash. However, the present invention is not limited to such a braking torque. It is obvious that the braking torque of the second drive device 13 may be determined by the number of revolutions of the second drive device 13 so as to optimize the efficiency of the second drive device (electric motor). This makes it possible to increase the electricity efficiency of the second drive device 13.

The preferred embodiment has been described with reference to a case where it is determined in steps S2 and S3 that the target torque changes from negative to positive when the target torque is negative and has a positive acceleration, and it is determined in steps S2, S6, and S7 that the target torque changes from positive to negative when the target torque is not negative, has a negative acceleration, and is equal to or lower than Q1. However, the present invention is not limited to such a method of determining the sign of the target torque. It is obvious that a change in the sign of the target torque may be determined based, for example, on the magnitude of acceleration of the target torque instead of some of the above-mentioned conditions or in addition to the above-mentioned conditions.

The preferred embodiment has been described with reference to a case where no intermediate shaft is disposed between the output shaft 16 and the first input shaft 14 and between the output shaft 16 and the second input shaft 15. However, the present invention is not limited to such a configuration. It is obvious that at least one intermediate shaft may be provided with a gear disposed on each intermediate shaft and provided with a gear train configured to form a part of the first speed reducer 20 and second speed reducer 30.

The preferred embodiment has been described with reference to a case where the first input shaft 14 and the second input shaft 15 directly receive the driving force of the first drive device 12 and second drive device 13. However, the present invention is not limited to such a configuration. It is obvious that, for example, a gear train and a belt may be disposed between the first drive device 12 and the first input shaft 14 and between the second drive device 13 and the second input shaft 15.

The preferred embodiment has been described with reference to a case where the first input shaft 14 and the second input shaft 15 are coaxially disposed. However, the present invention is not limited to such a configuration. It is obvious that the first input shaft 14 and the second input shaft 15 may be disposed in parallel with each other or disposed to cross each other.

The preferred embodiment has been described with reference to a case where a gear train is used to configure the first speed reducer 20 and the second speed reducer 30. However, the present invention is not limited to such a configuration. It is obvious that an alternative speed reducer using, for example, a belt and a continuously variable transmission (CVT) may be used as the first speed reducer 20 and the second speed reducer 30.

The preferred embodiment has been described with reference to a case where the first speed reducer 20 is disposed separately from the first drive device 12. However, it is obvious that the first speed reducer 20 may be built integrally with the first drive device 12 like a geared motor. Similarly, it is obvious that the second speed reducer 30 may be built integrally with the second drive device 13.

The preferred embodiment has been described with reference to a case where the first clutch 40 is disposed to connect and disconnect the first input shaft 14 and the second input shaft 15. However, the present invention is not limited to such a configuration. It is obvious that the first clutch 40 may be omitted.

The preferred embodiment has been described with reference to a case where a one-way clutch is used as the second clutch 23, which connects and disconnects the first speed reducer 20 to and from the output shaft 16. However, the present invention is not limited to such a configuration. It is obvious that, for example, a friction clutch or a dog clutch may alternatively be used to configure the second clutch 23. When such an alternative configuration is adopted, the control device 50 controls the engagement and disengagement of the second clutch 23 formed by using, for example, the friction clutch or the dog clutch.

The preferred embodiment has been described with reference to a case where the wheels 19 are attached to the axles 17 disposed in parallel with the output shaft 16. However, the present invention is not limited to such a configuration. It is obvious that, for example, a pair of propeller shafts may alternatively be connected to the differential device 18 and respectively connected to the axles.

Adopting such an alternative configuration makes it possible to obtain a four-wheel drive vehicle.

DESCRIPTION OF REFERENCE NUMERALS

10: vehicle
12: first drive device (drive device)
13: second drive device (drive device, electric motor)
16: output shaft
20: first speed reducer
30: second speed reducer
51: torque control section
52: limiting section

The invention claimed is:

1. A control device for a vehicle including two drive devices, a first speed reducer, and a second speed reducer, the first speed reducer transmitting a torque of one of the two drive devices to an output shaft, the second speed reducer transmitting a torque of the other drive device to
   the output shaft at a reduction ratio different from the reduction ratio of the first speed reducer, the control device comprising a memory device and a CPU that performs arithmetic processing based on a program stored in the memory device to implement a torque control section that, based on a target torque, controls the torques outputted from the two drive devices;
   wherein the torque control section includes a limiting section for controlling the torques that are outputted from the two drive devices when a sign of the target torque changes from a first sign to a second sign; and
   wherein, while allowing one of the two drive devices to output a torque for reducing the backlash of the first speed reducer or second speed reducer, the limiting section allows the other drive device to output a torque based on the target torque, the torque being a torque of a magnitude based on the difference in reduction ratio between the first speed reducer and the second speed reducer.

2. The control device according to claim 1, wherein, when the sign of the target torque is the first sign, the limiting section starts allowing one of the two drive devices to output the torque for reducing the backlash.

3. The control device according to claim 1,
   wherein at least one of the two drive devices is an electric motor, and
   wherein the limiting section allows the electric motor to output a braking torque, and allows the other drive device to output a power running torque.

4. A vehicle comprising two drive devices, a first speed reducer, and a second speed reducer, the first speed reducer transmitting a torque of one of the two drive devices to an output shaft, the second speed reducer transmitting a torque of the other drive device to the output shaft at a reduction ratio different from the reduction ratio of the first speed reducer, a control device and a switching device,
   the switching device providing electrical braking of at least one of the first and second drive devices, the control device comprising:
   a memory device and a CPU that performs arithmetic processing based on a program stored in the memory device to implement a torque control section that, based on a target torque, controls the torques outputted from the two drive devices;
   wherein the torque control section includes a limiting section for controlling the torques that are outputted from the two drive devices using the switching device when a sign of the target torque changes from a first sign to a second sign; and
   wherein, while allowing one of the two drive devices to output a torque for reducing the backlash of the first speed reducer or second speed reducer, the limiting section allows the other drive device to output a torque based on the target torque, the torque being a torque of a magnitude based on the difference in reduction ratio between the first speed reducer and the second speed reducer.

* * * * *